H. Tritchell,
Pocket Knife.

N° 42,031.    Patented Mar. 22, 1864.

Witnesses:
R. J. Fitzgerald.

Inventor:
Homer Tritchell.

UNITED STATES PATENT OFFICE.

HOMER TWITCHELL, OF NAUGATUCK, CONNECTICUT.

IMPROVEMENT IN POCKET-KNIVES.

Specification forming part of Letters Patent No. 42,031, dated March 22, 1864.

*To all whom it may concern:*

Be it known that I, HOMER TWITCHELL, of the town of Naugatuck, in the county of New Haven and State of Connecticut, have invented a new and useful Improvement in Pocket-Knives; and I do hereby declare that the following is a full, clear, and exact description of the construction, character, and operation of the same, reference being had to the accompanying drawings, which make part of this specification, in which—

Figure 1:
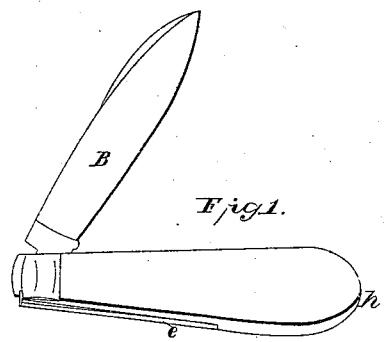
Figure 2:
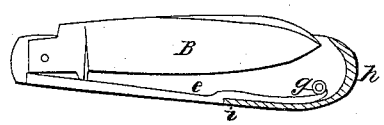
Figure 3:
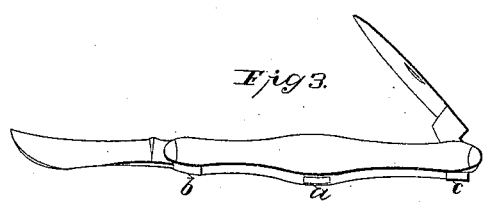
Figure 4:
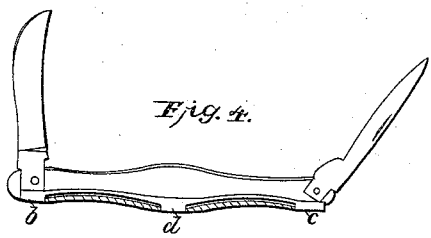

Figure 1 is a perspective view of a single-ended knife, showing the handle as made of one piece and the spring secured without rivets. Fig. 2 is a longitudinal section of the same, with one side of the handle removed, showing the shape of the spring and the manner of holding it without rivets. Fig. 3 is a perspective view of a two-ended knife, showing the handle cast of one piece and the spring secured without rivets. Fig. 4 is a longitudinal section of Fig. 3, with one side of the handle removed, showing the shape of the spring and how it is held without rivets.

My improvement consists in making the handle of the knife of one piece of cast or wrought metal, or of any other suitable material, in such a manner that it will receive and hold the spring without rivets, and in making the spring of such shape that it may be fitted and held securely in position without rivets, so that the spring will readily drop out when the blades are removed, using rivets only to hold the blades in the handle. I make the handle of the two-ended knife by casting it of iron, bronze, or any other suitable metal of one piece, with a suitable hole or mortise in the central part of the back, as shown at *a*, Fig. 3, to receive a projection or tenon on the central part of the spring, as shown in section in Fig. 4. I make the two ends of the handle suitable for receiving blades in the usual way, allowing the ends of the spring to pass through the back of the handle, so as to make a good finish, as seen at *b* and *c*, Figs. 3 and 4. I make the handle of the single-ended knife substantially the same as that of the two-ended, above described, except that I cast one end of the handle closed, as shown at *h*, Fig. 1, and I cast in a projection or piece of wire to hold the inner end of the spring similar to that shown at *g*, Fig. 2, and I make the spring with the projection or tenon on the central part, the same as for the two-ended knife, before described, except that I make the inner end somewhat like that shown in Fig. 2, so that the end of the spring may be held steady in its place; or I make the handle for the single-ended knife substantially in the form shown in Fig. 1, with a slot in the back about one-half of its length, as shown at *e*, Fig. 1, to allow the spring to work freely through to operate the blade. I cast or make the upper end of this slot at or nearly at right angles to the handle, as shown at *i*, Fig. 2, so that the spring cannot slip or yield to the pressure of the blade while cutting, and at the inner end I have a projection or pin cast in, against which the end of the spring rests securely, as shown at *g*, Fig. 2; and when I make the handle of the single-ended knife as last described I make the spring substantially in the shape shown at *e*, Fig. 2, and indicated at *e*, Fig. 1, so as to fit the slot in the handle, and to be held in its position by the blade B, the right-angled projection at *i* and the curved part embracing the projection or pin *g*, all as shown in Fig. 2. The handle for either may be made of one piece of plate or sheet metal and swaged or struck up to the desired shape, or made of one piece of any other suitable material, but I prefer casting the handles of iron or bronze metal; and the spring may be made with a notch or space in the central part to fit onto a projection in the inside of the handle, but I prefer to have it pass through the back of the handle, as hereinbefore described. These handles may be made to receive any number of blades either at one end or at both ends, and the suitable number of springs, as desired.

The advantages of my improvement consist in that by fitting the spring or springs without rivets I am able to make a more durable as well as a neater finished knife at less expense than could be if the spring were secured by rivets.

I do not claim the handle, spring, or blade, as such, as my invention; but

What I claim as my invention, and desire to secure by Letters Patent, is—

The combination of the handle, spring, and blade, when the whole is constructed and fitted to operates ubstantially as herein described.

HOMER TWITCHELL.

Witnesses:
R. FITZERALD,
FRED C. WIRE.